Oct. 6, 1931.   W. A. MATTHEY   1,825,881
VARIABLE PITCH AIRPLANE PROPELLER
Filed July 27, 1929   2 Sheets-Sheet 1

INVENTOR
William A. Matthey
BY Arthur C. Brown
ATTORNEY

Oct. 6, 1931.  W. A. MATTHEY  1,825,881
VARIABLE PITCH AIRPLANE PROPELLER
Filed July 27, 1929  2 Sheets-Sheet 2
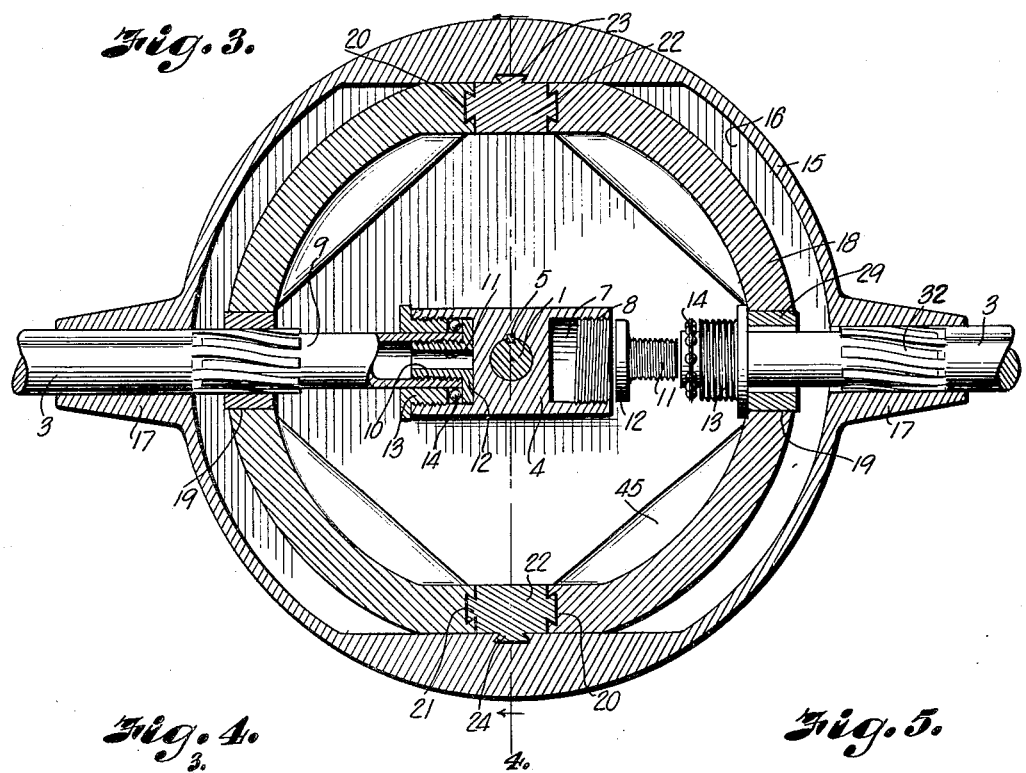
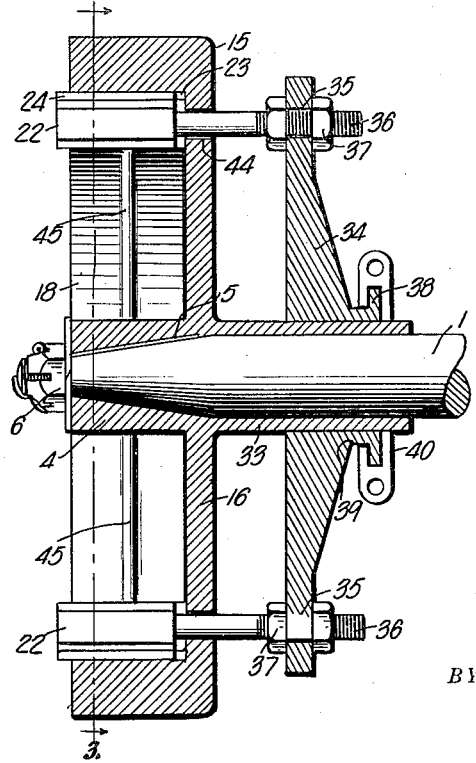
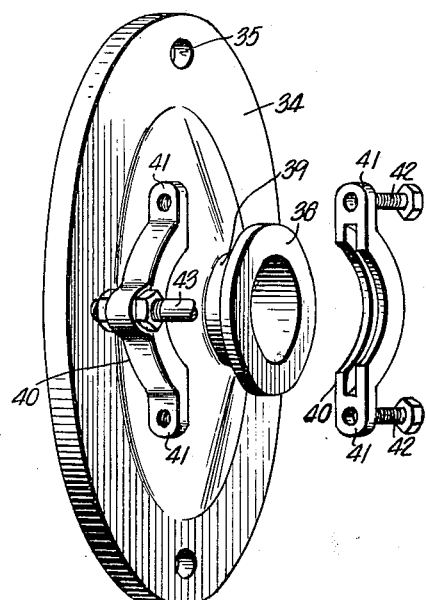
INVENTOR
William A. Matthey
BY Arthur le Brown
ATTORNEY Patented Oct. 6, 1931

1,825,881

UNITED STATES PATENT OFFICE

WILLIAM A. MATTHEY, OF KANSAS CITY, MISSOURI

VARIABLE PITCH AIRPLANE PROPELLER

Application filed July 27, 1929. Serial No. 381,643.

My invention relates to airplane propellers, and has for its principal objects to enable the pilot of the airplane to adjust the pitch of propeller blades.

Devices heretofore provided for adjusting the pitch of propeller blades to suit the speed of the engine or for similar purposes, have usually been operable automatically responsively to centrifugal influences set up by revolution of propellers, and in operation have tended to throw the propeller unit out of balance.

Further objects of my invention therefore are to enable the operator of an airplane to adjust the pitch of propeller blades either while the propeller is still or while it is revolving, without disturbing the perfect degree of balance necessary in this unit, to assure control of the pitch of a propeller by the operator, and to embody pitch-adjusting mechanism in airplane structure without weakening any members.

In accomplishing these and other objects of my invention, I have provided improved details of structure, the preferred forms of which are illustrated in the accompanying drawings, wherein:

Fig. 3 is a vertical section on the line 3—3, Fig. 4, illustrating one blade shaft withdrawn laterally from the propeller hub, and a nut in position for insertion into the end of the shaft.

Fig. 4 is a vertical section on the line 4—4, Fig. 3, illustrating the relation of a slidable operating disk to the propeller hub and shaft.

Fig. 5 is a perspective view of the sliding disk, split collar members adapted to engage the disk, and an operating rod for moving the disk shown fragmentarily.

Figure 1:
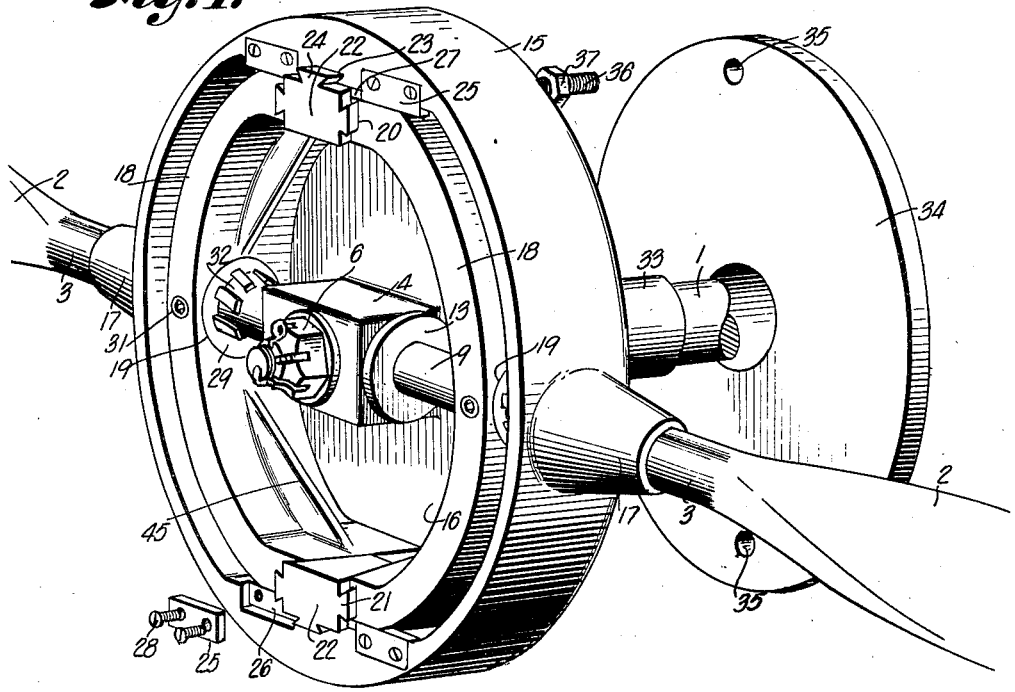
Fig. 1 is a perspective view of a portion of a propeller shaft and a propeller hub equipped in accordance with my invention, an operating disk, and a retaining plate being shown displaced from assembled position.

Referring in detail to the drawings:

1 designates a propeller operating motor shaft, and 2 propeller blades having posts or spindles 3 comprising shafts adapted to be adjustably mounted as presently described in a hub including a bearing portion 4 keyed to the shaft 1 by a spline 5 and retained therein by a nut 6.

The hub portion 4 comprises an elongated body having sockets or recesses 7 at opposite ends provided with threads 8 spaced from the inner ends of the recesses.

The inner ends of the blade shafts are reduced to form bearing ends 9 provided with axial threaded sockets 10 adapted to receive the threaded bodies 11 of flange-like retaining members 12 for forming radial flanges on the ends of the shafts receivable and rotatable in the bottoms of the hub recesses.

Threaded bushings 13 slidable on the blade shaft ends 9 are engageable with the threaded portions of the recessed hub for retaining the flanged shaft end in the hub, and ball bearings 14 are installed between the flanges 12 and end edges of the bushings to facilitate rotation of the shafts in the hub and eliminate thrust at this point due to centrifugal force of the blade when rotating at high speed.

The hub further includes a wheel portion 15 attached to the portion 4 by a web 16, and provided with diametrically opposite elongated hollow bosses 17 and bearing openings for rotatably receiving and supporting the blade shafts. The wheel is provided further for supporting a yoke element comprising similar semi-circular yoke members 18 engaging the inner periphery of the wheel. The yoke members are provided with suitable openings 19 for passage of the blade shafts to the hub.

Figure 2:
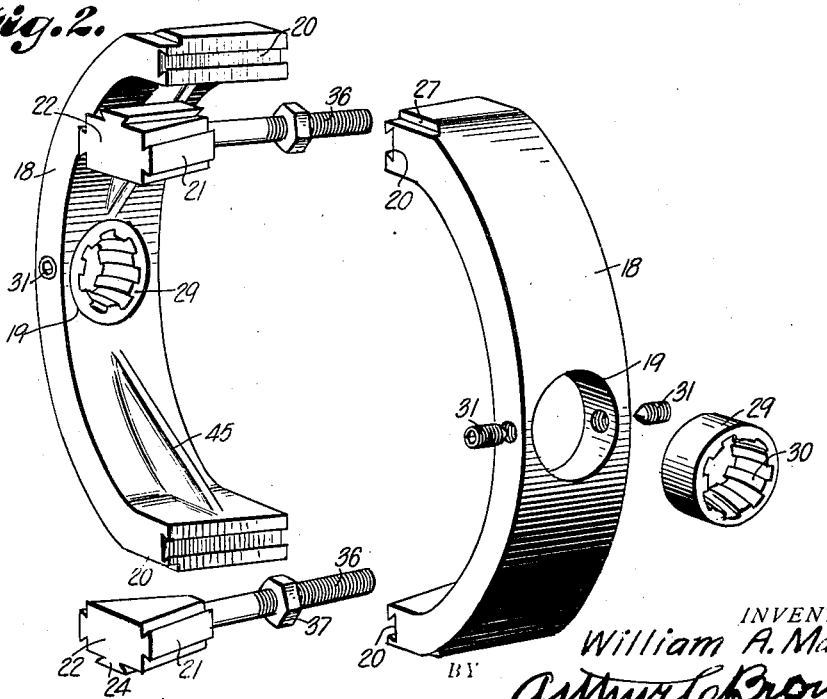
Fig. 2 is a perspective view of operating yoke members and wedges for adjusting the yoke members to vary the pitch of propeller blades, the wedges and a grooved sleeve for receiving the shaft of a blade being shown disassembled.

Transverse dovetail slots or grooves 20 having taper bottoms are formed in the ends of the yoke members, and the ends of the members are tapered correspondingly, whereby dovetail tongues 21 of taper sided wedges 22 may be mounted in the grooves for securing the yoke members together. The wedges may be moved slidably for varying the spacing between adjacent ends of the yoke members. The end faces of the yoke members are tapered for substantially half of the width of the members, as clearly shown in Figs. 1 and 2 to form diverging portions of adjacent end faces.

Dovetail slots 23 in the wheel are adapted to receive tongues 24 on the wedges for guiding the wedges and assuring movement thereof on a center line between the ends of the yoke members.

The yoke members when mounted in the recess of the wheel and stopped by the web thereof are retained by blocks 25 countersunk in adjacent recesses 26 in the wheel and slots 27 in the yoke members, and secured by screws 28, to prevent slippage of said ends and distortion of the yoke members when the wedges are moved to expand or contract the yoke element as presently described.

The yoke members when moved by the wedges slide over the blade shafts toward or away from the hub, and are adapted to move the blades rotatively to vary the pitch thereof. For this purpose sleeves 29 having spirally arranged splines 30 forming longitudinally extending grooves are fixed in the openings 19 by set screws 31, and slanting grooves 32 are formed in the shafts to receive the sleeve splines.

The hub further comprises a sleeve-like extension 33 projecting rearwardly of the propeller shaft toward the position of the pilot of the airplane, and therefore rotating with the propeller shaft.

Slidably mounted on the sleeve 33 in spaced relation with the wheel is a disk 34 having apertures 35 registering with the axis of the wedges, and rod-like operating shanks 36 on the wedges have rear ends extending in said openings and fixed to the disk by nuts 37.

A radial flange 38 fixed to the disk by a cylindrical spacing neck 39 receives rotatably a split yoke comprising semi-circular grooved members 40 having end ears 41 apertured to receive bolts 42 for securing the members together with the disk flange in the grooves.

An operating rod 43 fixed in one of the yoke members extends to the pilot's position, for shifting the disk on the sleeve and moving the wedges in the dovetail slots to vary the pitch of the blades.

The web portion 16 of the wheel is integral with the hub and has apertures 44 through which the wedge shanks extend. The yoke members may be reinforced by ribs 45.

In assembling the device, the yoke members are connected by the wedges and mounted in the wheel, and the blade shafts are inserted in the registering openings of the wheel and yoke element, the grooved portions of the shafts being positioned in the hollow bosses of the wheel for spacing the inner ends of the shafts from the hub.

The bushings and bearings are then mounted on the reduced ends of the shafts, and the flanged retaining members are screwthreaded in the recesses, Fig. 3 showing one blade shaft installed and the other blade shaft and related member in position for inserting the retaining member in the shaft.

The shaft end 9 equipped with the flanged retainer, is moved inwardly to locate the retainer in the unthreaded bottom portion of the hub recess, and the bushing is threaded into the hub to retain the shaft rotatably in the hub. The grooved portion of the shaft will then engage the splined bushings or sleeve in the yoke element openings.

The disk carrying the split operating collar is mounted on the rearwardly projecting sleeve, and the hub and wheel are mounted on the propeller shaft. The operating rod is then connected with the split collar.

The pilot may move the rod reciprocably for shifting the wedges in the grooves of the yoke element, and thus move the splined sleeves thereof over the grooved portions of the blade shafts, and effect change of pitch of the blades.

What I claim and desire to secure by Letters Patent is:

1. In a variable pitch propeller including a motor shaft, a hub, and propeller blades rotatable in the hub, yoke members slidable in the hub, means including wedge members engaged with the hub for moving the yoke members, and means effecting change of pitch of the blades when the yoke members are moved slidably in the hub.

2. In a variable pitch airplane propeller including a motor shaft, a hub, members having spirally grooved openings supported by the hub, and propeller blades having portions formed with spirals slidable in said spiral grooves of the hub, means including manually operable wedges connected to said members for moving said members to adjust the pitch of the blades.

3. In a device of the character described including a motor shaft and propeller blades having spirally grooved spindles, a hub including a wheel fixed to the shaft, a plurality of propeller-adjusting members having spindle-engaging portions mounted in the wheel, means securing adjacent ends of said members together for moving the same to vary the pitch of the blades, and manually operable means for moving said pitch-varying means.

4. In a device of the character described including a motor shaft and propeller blades having spirally grooved spindles, a hub including a wheel fixed to the shaft, a plurality of propeller-adjusting members having spindle-engaging portions mounted in the wheel, and means including wedges connecting adjacent ends of said members together for moving the same to vary the pitch of the blades.

5. In a device of the character described including a motor shaft and propeller blades having spirally grooved spindles, a hub including a shaft-engaging portion having a rearwardly extending tubular flange, a wheel portion, and a web connecting the shaft-engaging portion with the wheel portion, means in the wheel engaged with said grooved spindles for changing the pitch of the blades, and means including a disk slidable on said tubular flange for operating said pitch-changing means.

6. In a device of the character described including a motor shaft, propeller blades having spirally grooved spindles, and a hub including a shaft-engaging portion, means supported by the hub and engaged with said grooved spindles for changing the pitch of the blades, and means including a disk rotating with the shaft for operating said pitch-changing means.

7. In a device of the character described including a motor shaft, a hub adapted to be fixed to the shaft, propeller blades having spirally grooved spindles mounted in the hub, and members having spiral splines for engaging in said grooves of the spindles for varying the pitch of the blades, means including a wedge connecting said splined members for operating the same, and means including a collar movable longitudinally of the shaft and fixed against rotation for moving said wedge.

8. In a device of the character described, a hub member, propeller shafts rotatably mounted in the hub member, yoke members having splined connection with the shafts, a wedge member having dovetail connections with the yoke members and with the hub member, and means for shifting the wedge member to move the yoke members for effecting rotative movement of said shafts.

9. In a device of the character described, a hub member, propeller shafts rotatably mounted in the hub member, yoke members having splined connection with the shafts, a wedge member having dovetail connection with the yoke members, and manually operable means for shifting the wedge member to move the yoke members for effecting rotative movement of the shafts.

10. In a device of the character described, a hub member, propeller shafts rotatably mounted in the hub member, yoke members having splined connection with the shafts and slidably mounted in the hub, wedge members slidably fixed in the hub member and having dovetail connection with the yoke members, a rotatable disk associated with the hub member and connected with the wedge members, and means for moving the disk toward and away from the hub member to effect movement of the yoke members.

11. In a device of the character described, a hub member having propeller-receiving sockets, propeller shafts rotatably mounted in the hub member and having ends projecting into the sockets, means for anchoring the propeller shafts in the sockets including a ball thrust bearing, yoke members slidable in the hub member and having splined connection with the propeller shafts, wedges connecting the yoke members, and means for manually operating the wedges to actuate the yoke members for effecting rotative movement of the propeller shafts.

In testimony whereof I affix my signature.

WILLIAM A. MATTHEY.